United States Patent [19]
Vahlstrom et al.

[11] 3,735,261
[45] May 22, 1973

[54] PULSE ANALYZER

[75] Inventors: Richard E. Vahlstrom, Villa Park; Donald C. Nutten, Newport Beach; Lyle V. Rennick, Costa Mesa; Dennis R. Bayne, Placentia; Stanley Oster, Anaheim, all of Calif.

[73] Assignee: Northrop Corporation, Los Angeles, Calif.

[22] Filed: June 7, 1971

[21] Appl. No.: 150,377

[52] U.S. Cl. ..................324/181, 328/114, 324/102
[51] Int. Cl. ........G04f 9/00, H03k 5/20, G01r 19/00
[58] Field of Search..............................324/181, 102; 307/263, 235, 322; 328/114, 115, 116

[56] References Cited
UNITED STATES PATENTS

3,505,598   4/1970   Merrill..........................324/181 D X
3,519,849   7/1970   Tyler............................307/263 D X Primary Examiner—Alfred E. Smith
Attorney—William W. Rundle and Willard M. Graham

[57] ABSTRACT

Rise time, fall time, and width of a single short duration pulse are measured with no a priori knowledge of the pulse. First and second level detectors are used to respectively start and stop a ramp generator. The level detectors are biased to fire at certain defined percentages of the leading and/or trailing edge of the pulse depending upon which time parameter the detectors are measuring. A peak level detector and hold circuit connected to the ramp generator output gives a voltage amplitude proportional to the "on" time of the generator and thus indicative of the time interval being measured. To supply the level detectors with the proper information, an input and logic section produces from the incoming (positive) pulse its peak amplitude, negative peak amplitude, a delayed positive pulse, a delayed negative pulse, and timing signals for enabling and disabling the level detectors as necessary.

16 Claims, 8 Drawing Figures

Patented May 22, 1973

INVENTORS:
Richard E. Vahlstrom
Donald C. Nutten
Lyle V. Rennick
Dennis R. Bayne
Stanley Oster By William W. Rundle

AGENT

INVENTORS:
Richard E. Vahlstrom
Donald C. Nutten
Lyle V. Rennick
Dennis R. Bayne
Stanley Oster By William W. Rundle
AGENT

INVENTORS:
Richard E. Vahlstrom
Donald C. Nutten
Lyle V. Rennick
Dennis R. Bayne
Stanley Oster By William W. Rundle

AGENT

PULSE ANALYZER

The present invention relates to waveform analysis, and more particularly, to measurement of the time parameters of single pulses of short duration such as radar system pulses for example.

In order to determine the time parameters of a pulse it is first necessary to know the peak amplitude of that pulse. This is because these parameters are based upon times between certain percentages of the peak amplitude, i.e., pulse rise time is defined as the time required for the pulse leading edge to rise from 10 percent of the peak amplitude to 90 percent, and pulse width is defined as the time between the 50 percent peak point on the leading edge to the 50 percent point on the trailing edge.

In conventional pulse analyzing equipment employed in measuring properties of pulses in a train of several or a multiplicity of similar pulses, the peak pulse amplitude may be determined from the first pulse or pulses to occur, and the time parameters of the following pulses may then be determined while constantly monitoring and remembering the peak amplitude. When only a single pulse is available for measurement, such conventional equipment will not work, and no satisfactory prior art is known for obtaining the parameters of a single short duration pulse in the nanosecond region for example.

It is, therefore, an object of this invention to provide a means and method for accurately measuring the rise time, fall time, and width of a single short duration pulse with no a priori knowledge of that pulse. The peak pulse amplitude is also obtained and indicated in the process.

Other, ancillary, objects will be noted or specifically pointed out in the detailed description of the invention to follow.

Briefly as to method, our invention comprises producing from the actual incoming pulse a positive d.c. voltage proportional to the peak pulse amplitude and a negative d.c. voltage proportional to the inverted peak pulse amplitude, a delayed positive pulse and a delayed negative pulse, detecting the occurrence of certain amplitude points of the delayed pulses as predetermined percentages of said d.c. voltages, and measuring the time intervals between desired points.

Briefly as to apparatus, our invention comprises means for producing a positive and a negative reference voltage equal in amplitude to the peak amplitude of the incoming pulse, means for producing a positive and a negative delayed pulse of the same size and shape as the incoming pulse, a pair of programmable level detectors having said reference voltages connectable thereto, means for connecting a delayed pulse to said level detectors to fire at amplitudes determined by the reference voltage connection, a ramp generator connected to one of said level detectors to be triggered on by the firing of said one detector, and connected to the other level detector to be triggered off by the firing of said other detector, and peak level detector means connected to the output of said ramp generator. Holding means is provided for this output signal for reading or recording the signal as desired.

In order to obtain the three parameters rise time, width, and fall time from a single pulse occurrence, three separate sets of level detectors and ramp generators are employed, with the level detectors of each set being arranged to trigger at the proper times for a different one of the parameter measurements.

This invention may be more fully understood by reference to the following detailed description of a specific embodiment thereof, and to the accompanying illustrative drawings. In the drawings.

Figure 1:
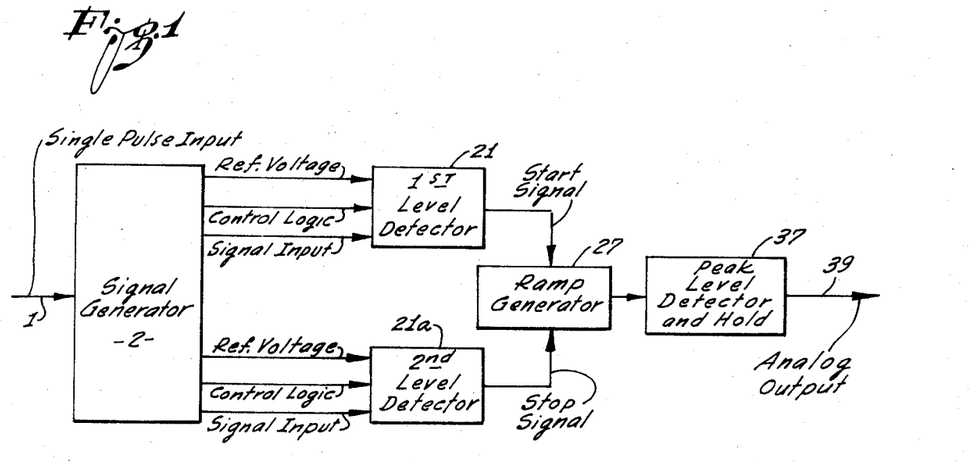
FIG. 1 is a block diagram showing a particular pulse time parameter measuring system in broad form, where the input signal consists of a single pulse only.

Referring first to FIG. 1 for a detailed description of our invention, a pulse input line 1 carries an input pulse to be measured, into the present system. This pulse may be from a radar system, for example. At any rate, there is assumed to be only one pulse fed in, and no properties of it are known beforehand, except its general nature. A positive pulse (only) is considered for the time being. Also where specific examples of apparatus and timing are given in the ensuing description, the input pulse being measured as an illustrative example is assumed to have a rise time in the neighborhood of 20 to 200 nanoseconds and a width in the neighborhood of 100 to 500 nanoseconds.

Figure 2:
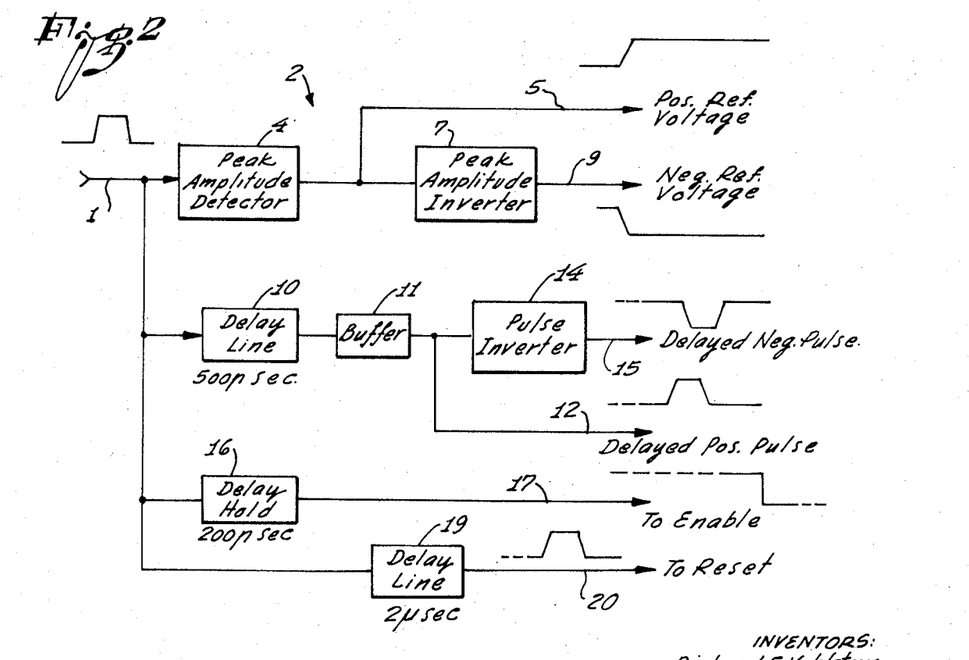
FIG. 2 is a block diagram showing the contents of the signal generator portion of FIG. 1.

Pulse input line 1 connects to a signal generator 2 comprised of the various units shown in FIG. 2. The method used here is to delay the incoming pulse while determining the peak amplitude of the pulse, then feed the delayed pulse into measuring circuitry which now "knows" the peak amplitude, so that the 10 percent amplitude point, 50 percent point, etc., of the leading and trailing edges can be determined. The pulse delay means must not introduce any substantial distortion.

Figure 3:
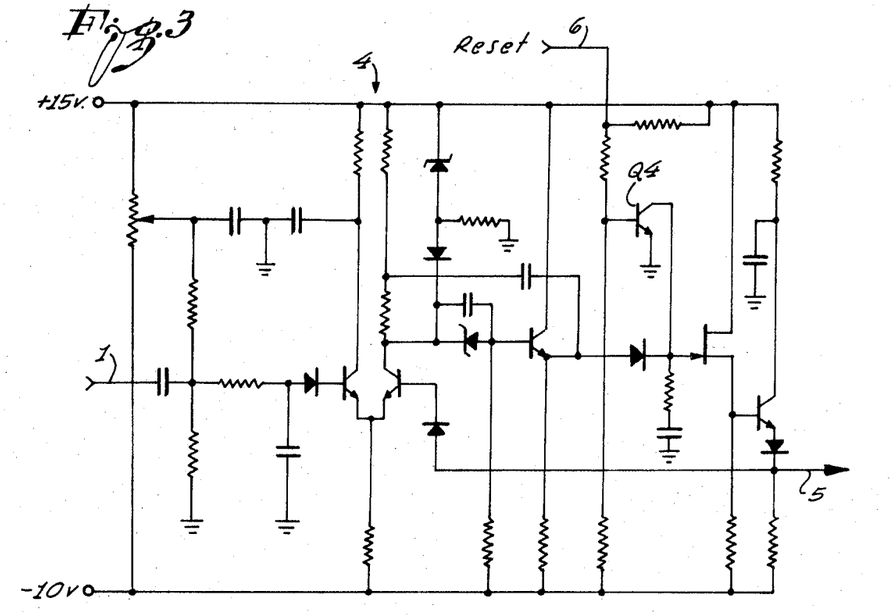
FIG. 3 is a schematic diagram showing a peak amplitude detector suitable for use in the apparatus of FIG. 2.

In the signal generator 2, a peak amplitude detector 4 is connected to the pulse input line 1, and the output reaches a value forming a positive reference voltage on a first output line 5 from the generator 2. A preferred circuit for the peak amplitude detector 4 is shown in FIG. 3, which has the capability of following the fastest rise of the signal appearing at its input, and maintaining an accurate amplitude for a given time period. A reset means comprising the circuit of transistor Q4 and a reset input terminal 6 is provided to reset the output voltage to zero before the measurement of another input pulse.

Figure 4:
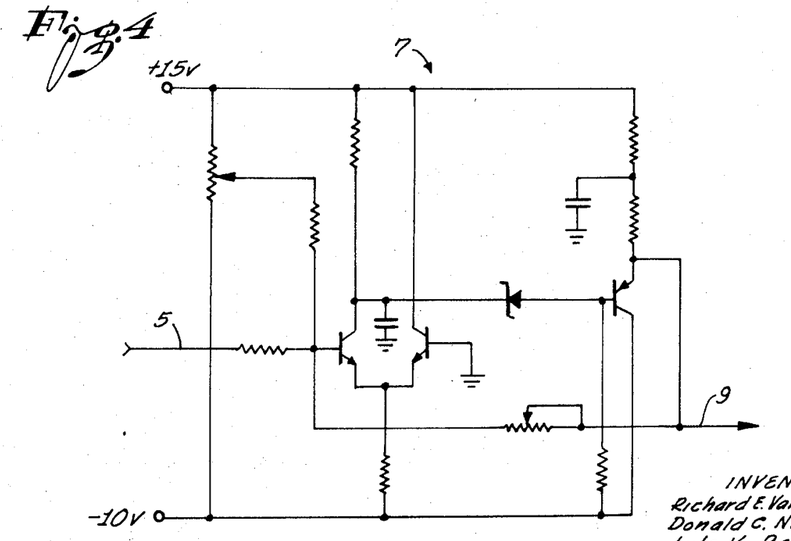
FIG. 4 is a schematic diagram showing a peak amplitude inverter suitable for use in the apparatus of FIG. 2.

A peak amplitude inverter 7 is connected to the output of the peak amplitude detector 4, and has an output forming a negative reference voltage on a second output line 9 from the generator 2. The negative reference voltage is equal in amplitude but opposite in polarity to the positive reference voltage. A preferred embodiment of the peak amplitude inverter 7 is shown in FIG. 4.

A delay line 10 is also connected to the pulse input line 1. This preferably comprises an electronic delay line having a delay time of 500 nanoseconds for example. The delay line output may be connected to a buffer 11, if desired, and then to a third output line 12 from the generator 2, where a delayed positive pulse is thus provided.

Figure 5:
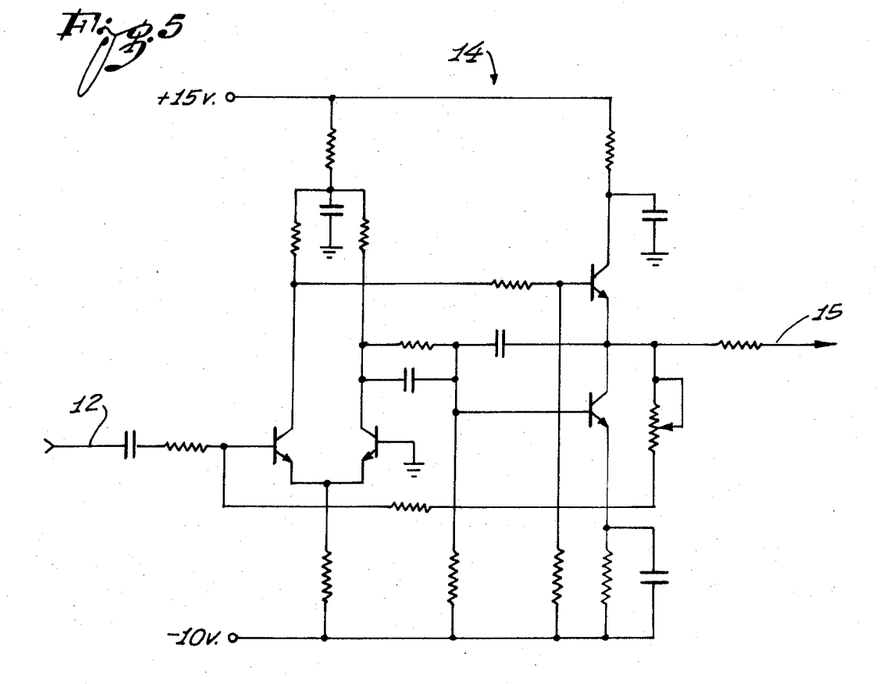
FIG. 5 is a schematic diagram showing a pulse inverter suitable for use in the apparatus of FIG. 2.

A pulse inverter 14 is connected to the output of the delay line 10 or buffer 11, and has an output forming a delayed negative pulse on a fourth output line 15. This inverted pulse is necessary in the measurement of pulse fall time, for instance, which will be described later. A preferred circuitry for the pulse inverter 14 is shown in FIG. 5.

The signal generator 2 also contains a delay and hold circuit 16 activated by the incoming pulse on pulse input line 1. This circuit may comprise a one-shot multivibrator, for example, having an "on" time of about 200 nanoseconds, for example. The output of delay and hold circuit 16 forms an "enable" signal on a fifth output line 17, which signal acts as a control for certain functions yet to be described.

To make a complete system which is automatically ready for measurement of another pulse, the signal generating section includes an additional delay line 19 producing a reset signal on a sixth output line 20 from the signal generator 2. The delay time of this additional delay line 19 need be only about 1 or 2 microseconds, for example.

Thus, this signal generating means provides all the necessary signals from which the present method can be performed, utilizing only a single input pulse to be measured. The delay time of delay line 10 must obviously be equal to or greater than the rise time of the incoming pulse. The reference voltages will be used as reference levels to permit the determination of specific percentages of the peak pulse amplitude by time interval detection devices. The delayed pulses will be used as signal inputs to the time interval detectors after the reference voltages have been established.

Reference is now made to the level detector portion of FIG. 1, which uses appropriate signals from the signal generator 2. As shown further in FIG. 6, a first level detector circuit 21 is composed of a first tunnel diode TD1 having a predetermined bias circuit 22 on its input side and a transistor switch 24 on its output side. The tunnel diode TD1 is initially biased to its "off" condition when the delayed signal pulse from either output line 12 or 15 from signal generator 2 reaches it, i.e., the total current through it is less than its firing current which produces an instantaneous rise in voltage across it. It is desired to fire TD1 at some specific input voltage level on a signal input line 25. By applying a reference voltage level equal to the peak amplitude of a pulse (but inverted in polarity) to one of a plurality of reference resistors 26, and then admitting a delayed signal pulse on the input line 25, TD1 will fire at the precise instant desired. This means when the pulse reaches either 10 percent, 50 percent, or 90 percent of its peak value in this example, depending upon to which reference resistor 26 the reference voltage was applied. The reference resistors 26 are calculated from a knowledge of the firing current of the particular tunnel diode used, and knowing what value of instantaneous input voltage on the signal input line 25 is to produce this firing current. Total bias current through TD1 is of course determined by both the bias circuit 22 and the chosen reference resistor 26. When TD1 fires, the transistor switch 24 is turned on, and a negative starting voltage is applied to the input of a ramp generator 27 to be described later.

Figure 6:
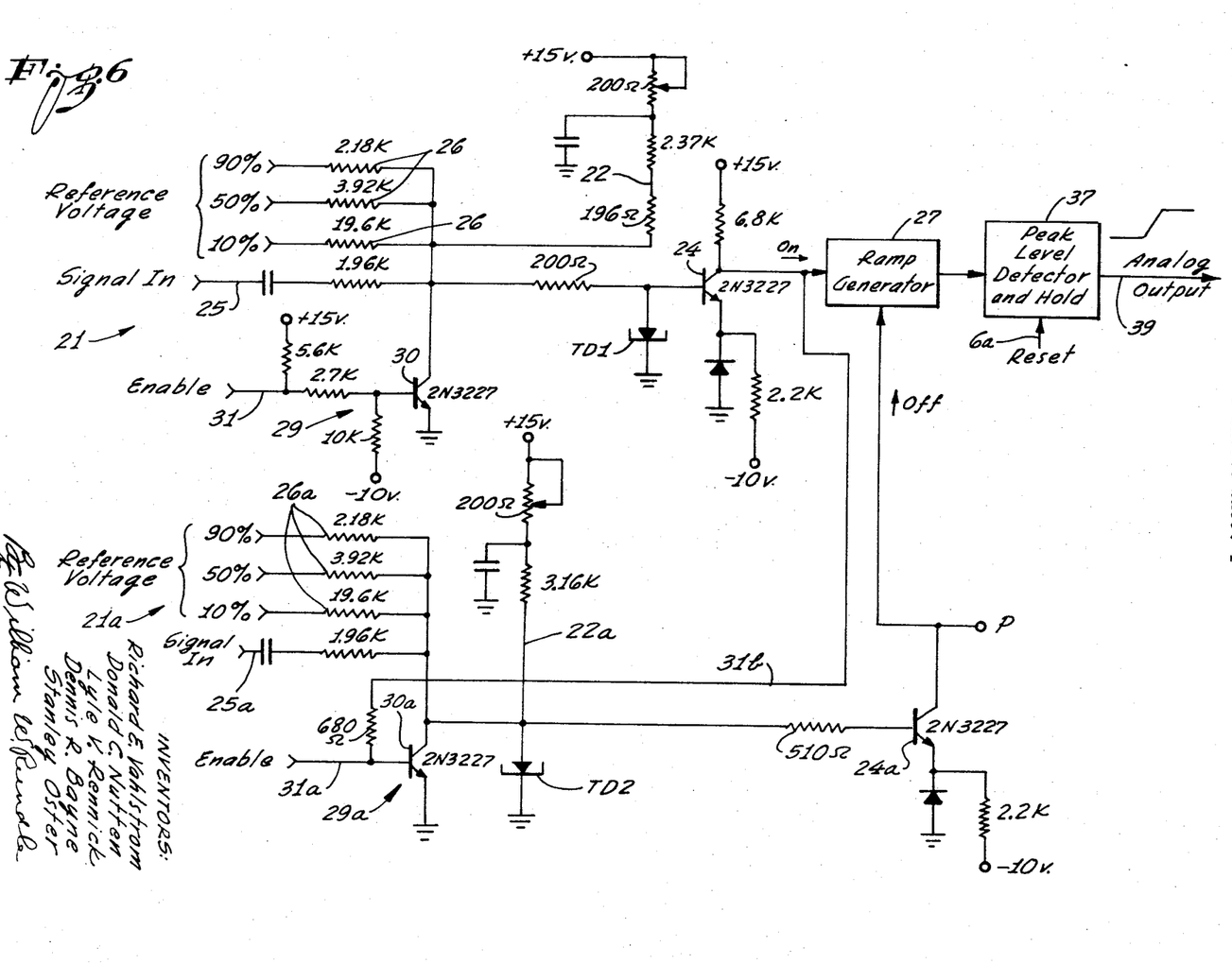
FIG. 6 is a schematic diagram showing a pair of programmable level detectors or time interval detectors as used in the system of FIG. 1.

In order to keep TD1 turned off before the beginning of a pulse measuring operation, a clamping circuit 29 having a normally saturated control transistor 30 is connected to the input side of TD1. As long as transistor 30 is turned on, the tunnel diode TD1 is kept off, no matter what the input voltage conditions might be. A negative signal at the proper time on an enable line 31 will turn off control transistor 30 and thus allow its collector voltage to assume whatever value the operating conditions require.

A second level detector circuit 21a, composed of a second tunnel diode TD2, bias circuit 22a, transistor switch 24a, signal input line 25a, and reference resistors 26a, is programmed to be fired at the exact instant that a second predetermined portion of the pulse on signal input line 25a is reached. When TD2 fires, transistor switch 24a is turned on, and a negative stopping voltage is applied to the ramp generator 27. A clamping circuit 29a having an enable line 31a is connected to the circuit of TD2 similar to the TD1 circuit, to assure that tunnel diode TD2 remains unaffected until time to begin its required interval measurement. An internal enable line 31b is also connected to clamping circuit 29a from the output of the TD1 circuit, as will be mentioned later.

It will now be clear that in order to measure pulse rise time, for example, the proper reference voltage will be connected to the 10 percent reference resistor of the TD1 circuit and to the 90 percent reference resistor of the TD2 circuit. The reference voltage thus connected is the negative reference voltage from the second output line 9 of the signal generator 2, which voltage is equal to the (inverted) peak amplitude of the pulse being analyzed. Further, the signal from the delay and hold circuit 16 on the fifth output line 17 of signal generator 2 is connected to the enable lines 31 and 31a of both tunnel diode circuits, and the delayed positive pulse from signal generator third output line 12 is connected to the signal input lines 25 and 25a.

Figure 8:
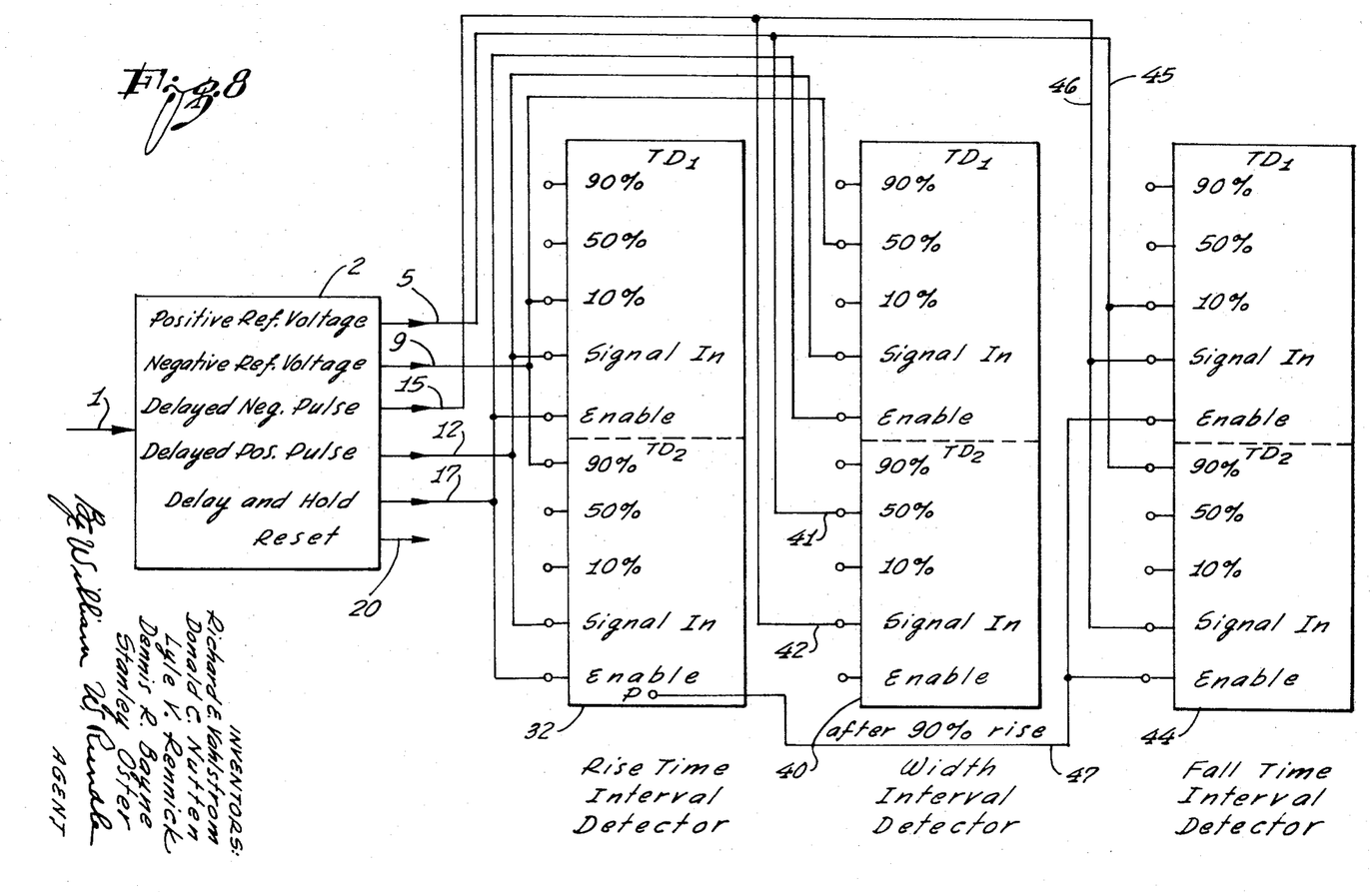
FIG. 8 is a block diagram showing the connections of three sets of level detectors to the signal generator to provide rise time, width, and fall time simultaneously from a single input pulse.

The result of these connections is that the level detector 21 of FIG. 6 is programmed as a rise time interval detector 32 as shown in FIG. 8. When the TD1 circuit of this rise time detector 32 is fired at the 10 percent of peak amplitude point on the pulse leading edge, the ramp generator 27 is started and builds up a voltage at a known linear time rate. When the TD2 circuit is fired at the 90 percent of peak amplitude point, the ramp generator 27 is stopped, so that its amplitude at this time is a measure of the 10 percent to 90 percent time interval.

Figure 7:
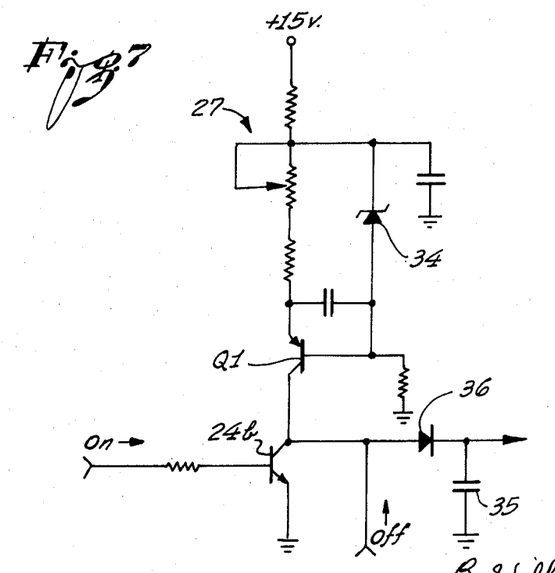
FIG. 7 is a schematic diagram of a ramp generator suitable for use in the apparatus of FIGS. 1 and 6.

A suitable ramp generator 27 is shown in FIG. 7. This includes a constant current source comprising a transistor Q1 and a zener diode 34, and a capacitor 35 of known constant value. In this embodiment, an additional transistor switch 24b is kept normally on by the first transistor switch 24 in the TD1 circuit, to thereby normally hold the ramp generator output voltage at zero. When TD1 fires, additional transistor switch 24b is turned off to allow a ramp voltage to begin building up across capacitor 35. When TD2 fires, the negativegoing voltage at the output of transistor switch 24a stops the buildup of ramp voltage by returning the collector voltage of additional transistor switch 24b back to zero.

Of course the ramp voltage remains temporarily across the capacitor 35 due to a reverse-biased series diode 36. Also, as shown in FIGS. 1 and 6, a peak level detector and hold circuit 37 is connected to the output of the ramp generator 27, and the desired output voltage is thereby retained in circuit 37 until no longer needed. The peak detector and hold circuit 37 is similar to the peak amplitude detector 4, and the embodiment of FIG. 3 is representative of this type.

A parameter output line 39 connected to the output of the peak level detector and hold circuit 37 of the rise time detector 32 may lead to an indicator or recorder, not a part of this invention, for utilization as desired. After utilization, a reset pulse from the sixth output line 20 of signal generator 2 to the reset terminals 6 and 6a of the peak detector circuits 4 and 37 discharges the output to zero to be ready for measurement of a subsequent input pulse.

It can also be seen that if the pulse width measurement is desired to be made by the circuit of FIG. 6, then the negative reference voltage from the second output line 9 of the signal generator 2 will be connected to the 50 percent reference resistor of the TD1 circuit. A separate width interval detector 40 is shown in FIG. 8, illustrating the proper connections from the signal generator 2. In this case, the positive reference voltage is connected by a conductor 41 to the 50 percent reference resistor of TD2, and the delayed negative pulse is connected by another conductor 42 to the signal input line of TD2, so that the ramp generator turn-off signal will be given at the 50 percent up point of the trailing edge of the inverted delayed signal pulse, which point is equivalent to the 50 percent down point of the trailing edge of the original positive pulse being measured.

Also, it is pointed out that, in the case of width measurement, the enable signal to the clamping circuit 29a of TD2 does not come from the signal generator 2, but from the internal enable line 31b (FIG. 6), such enable signal not being applied to TD2 until TD1 is fired at the 50 percent rise point. This is to allow the reference voltage in the TD2 circuit to build up far enough so that TD2 will not be fired prematurely. By way of explanation, it will be seen that the actuation of the enable circuit on the control transistors 30 or 30a in the absence of a reference voltage will fire the tunnel diode circuit without having an input signal at all.

The width interval detector 40 naturally also includes its own ramp generator 27 and peak level detector and hold circuit 37, so that the width measurement is available simultaneously with the rise time measurement from rise time interval detector 32.

By similar reasoning, the fall time of the incoming pulse to be measured is obtained from a fall time interval detector 44 (FIG. 8). The necessary time interval is measured between the 10 percent up and 90 percent up points of the trailing edge of the inverted pulse (equivalent to the 10 percent down and 90 percent down points on the original positive pulse trailing edge). This is done by providing a lead 45 from the positive reference voltage on the first generator output line 5 to the 10 reference resistor of the TD1 circuit and to the 90 percent reference resistor of the TD2 circuit. Another lead 46 is connected from the delayed negative pulse on the fourth generator output line 15 to the signal input lines of both TD1 and TD2 circuits. Lastly, a further lead 47 is connected from the output side of the TD2 circuit of the rise time interval detector 32 to both enable lines of the fall time interval detector 44, so that the fall time tunnel diode circuits are not enabled until the leading edge of the delayed pulse being measured has reached 90 percent of its peak amplitude. This connection of further lead 47 is shown as point P in FIGS. 6 and 8.

Thus the fall time measurement is also given simultaneously with the rise time and width, and all from only a single incoming pulse. It is obvious that a certain range of pulse parameters can be measured with one specific system, and that the various time delays can be adjusted to suit other ranges. Further, the same system functions can be performed with many modifications of the detailed circuitry. For the amplitude level detectors 21 and 21a, the tunnel diode could be inverted, using PNP transistors and negative supply voltages instead of the NPN transistors disclosed herein. Negative incoming pulses can be handled preferably by first inverting them and using the same circuitry as shown.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. The method of measuring the time parameters of a single pulse comprising producing from said pulse a positive d.c. voltage proportional to the peak pulse amplitude, a negative d.c. voltage proportional to the inverted peak pulse amplitude, a delayed positive pulse and a delayed negative pulse, detecting the occurrence of certain amplitude points of said delayed pulses as predetermined percentages of said d.c. voltages, and measuring the time intervals between desired points.

2. The method of measuring the rise time, width and fall time of a single pulse comprising producing from said pulse a positive and a negative d.c. voltage each proportional to the peak pulse amplitude, a delayed positive pulse and a delayed negative pulse, detecting the occurrence of the 10 percent, 50 percent and 90 percent peak amplitude points of the leading edge of said delayed pulses and the 90 percent, 50 percent and 10 percent peak amplitude points of the trailing edge of said delayed pulses, as referred to said d.c. voltages, and measuring the three time intervals between said 10 percent and 90 percent leading edge points, said 50 percent leading and trailing edge points, and said 90 percent and 10 percent trailing edge points, the detecting and measuring of all three time intervals being done substantially simultaneously.

3. Apparatus for measuring the time parameters of a single incoming pulse comprising a peak amplitude detector adapted to receive said incoming pulse, a peak amplitude inverter connected to the output of said peak amplitude detector, pulse delay means adapted to also receive said incoming pulse and having a delay time at least as great as the rise time of said incoming pulse, and a pulse inverter connected to the output of said delay means, whereby the delayed pulses from said delay means and said pulse inverter are available for measurement after the peak amplitude of said incoming pulse is determined by said peak amplitude detector.

4. Apparatus for measuring the time parameters of a single incoming pulse comprising a peak amplitude detector adapted to receive said incoming pulse, a peak amplitude inverter connected to the output of said peak amplitude detector, pulse delay means adapted to also receive said incoming pulse and having a delay time at least as great as the rise time of said incoming pulse, a pulse inverter connected to the output of said delay means, and pulse analyzing means connected to the outputs of said peak amplitude detector, said peak amplitude inverter, said delay means and said pulse inverter, said pulse analyzing means adapted to measure said time parameters.

5. Apparatus for measuring the time parameters of a single incoming pulse comprising a peak amplitude detector adapted to receive said incoming pulse, a peak amplitude inverter connected to the output of said peak amplitude detector, pulse delay means adapted to also receive said incoming pulse and having a delay time at least as great as the rise time of said incoming pulse, a pulse inverter connected to the output of said delay means, a first and second amplitude level detector each having trigger means with inputs connectable to the outputs of said delay means and said inverter, each said trigger means adapted to be actuated at a predetermined state, bias means connected to each of said trigger means, reference means in each of said bias means connectable to the outputs of said peak amplitude detector and said peak amplitude inverter, said reference means in said first level detector being structured to cause a first predetermined percentage of peak pulse amplitude to actuate its respective trigger means, and said reference means in said second level detector being structured to cause a second predetermined percentage of peak pulse amplitude to actuate its respective trigger means, and measuring means connected to the outputs of said level detectors to determine the time interval between the actuations of the two trigger means.

6. Apparatus in accordance with claim 5 wherein said measuring means comprises a ramp generator having a starting input connected to the output of said first level detector, and a stopping input connected to the output of said second level detector.

7. Apparatus in accordance with claim 6 including a peak detector and holding means connected to the output of said ramp generator.

8. Apparatus in accordance with claim 5 wherein each of said level detectors comprises a tunnel diode, a bias circuit normally allowing a certain current flow through said tunnel diode, a reference resistance connected at one end in said bias circuit and connectable at the other end to said peak amplitude detector and said peak amplitude inverter outputs, and pulse signal input means to said tunnel diode, said input means connectable to the outputs of said delay means and said inverter, whereby when the proper reference resistor value is used, the delayed pulse applied to said pulse signal input means will fire said tunnel diode at a given percentage of peak pulse amplitude.

9. Apparatus in accordance with claim 8 including a clamping circuit connected to said tunnel diode to normally hold said diode in the low voltage condition regardless of currents through said bias circuit, said reference resistance and said pulse signal input means, and enabling means for effectively open-circuiting said clamping means to allow said tunnel diode to fire as required.

10. Apparatus for measuring more than one time parameter of a single incoming pulse comprising a peak amplitude detector adapted to receive said incoming pulse, a peak amplitude inverter connected to the output of said peak amplitude detector, pulse delay means adapted to also receive said incoming pulse and having a delay time at least as great as the rise time of said incoming pulse, a pulse inverter connected to the output of said delay means, and a plurality of programmable interval detectors, one for each pulse time parameter to be measured, connected to the outputs of said peak amplitude detector, said peak amplitude inverter, said delay means and said pulse inverter, whereby the time intervals for all of said parameters are determined substantially simultaneously.

11. Apparatus in accordance with claim 10 including a separate peak detector and holding means connected to the output of each of said interval detectors.

12. Apparatus in accordance with claim 10 wherein each of said programmable interval detectors comprises a first and a second amplitude level detector each having trigger means with inputs connectable to the outputs of said delay means and said inverter, each said trigger means adapted to be actuated at a predetermined state, bias means connected to each of said trigger means and connectable to the outputs of said peak amplitude detector and said peak amplitude inverter, said bias means in said first level detector being structured to actuate its respective trigger means in response to the occurrence of a first predetermined percentage of peak pulse amplitude at said trigger means, and said bias means in said second level detector being structured to actuate its respective trigger means in response to a second predetermined percentage of peak pulse amplitude at said trigger means, and measuring means connected to the outputs of said first and second level detectors to determine the time interval between the actuations of the two trigger means.

13. In pulse analyzing apparatus, a first programmable level detector comprising a tunnel diode and a bias circuit together connectable across a source of operating voltage, input signal means connected to said tunnel diode, a reference voltage input connected to said tunnel diode, said reference voltage input being structured in relation to said bias circuit and said input signal means to cause said tunnel diode to trigger from its low potential state to high when an input pulse connected to said input signal means reaches a predetermined percentage of its peak amplitude, means for producing a d.c. reference voltage equal in magnitude to the peak amplitude of said input pulse, and means for connecting said d.c. reference voltage to said reference voltage input.

14. Apparatus in accordance with claim 13 including a plurality of different selectable reference elements in said reference voltage input, each said element valued to determine a tunnel diode firing point at a different predetermined percentage of peak input pulse amplitude.

15. Apparatus in accordance with claim 13 including a second programmable level detector similar to said first detector but triggering at a different predetermined percentage of peak pulse amplitude, and measuring means connected to the outputs of said level detectors to determine the time interval between the occurrence of the two triggers.

16. Apparatus in accordance with claim 13 including a clamping circuit connected to said tunnel diode to normally hold said diode in the unfired condition regardless of currents in its other connected circuits, and enabling means connected to said clamping circuit for effectively open-circuiting said clamping circuit to allow said tunnel diode to fire as required.

* * * * *